(12) United States Patent
Stählin

(10) Patent No.: US 9,461,762 B2
(45) Date of Patent: Oct. 4, 2016

(54) METHOD AND SYSTEM FOR COMPENSATING FOR A TIME DISCREPANCY

(71) Applicant: Continental Teves AG & Co. oHG, Frankfurt (DE)

(72) Inventor: Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 74 days.

(21) Appl. No.: 14/421,014

(22) PCT Filed: Aug. 15, 2013

(86) PCT No.: PCT/EP2013/067096
§ 371 (c)(1),
(2) Date: Feb. 11, 2015

(87) PCT Pub. No.: WO2014/027072
PCT Pub. Date: Feb. 20, 2014

(65) Prior Publication Data
US 2015/0222378 A1    Aug. 6, 2015

(30) Foreign Application Priority Data

Aug. 16, 2012  (DE) .................. 10 2012 214 555

(51) Int. Cl.
*H04B 7/212*    (2006.01)
*H04J 3/06*    (2006.01)
(Continued)

(52) U.S. Cl.
CPC ........... *H04J 3/0644* (2013.01); *G08G 1/0112* (2013.01); *H04B 7/18513* (2013.01); *H04J 3/0667* (2013.01); *H04J 3/0682* (2013.01)

(58) Field of Classification Search
CPC combination set(s) only.
See application file for complete search history.

(56) References Cited

U.S. PATENT DOCUMENTS 7,542,537 B2    6/2009  Widera
8,280,583 B2   10/2012  Stahlin
(Continued)

FOREIGN PATENT DOCUMENTS

DE    102007058192    6/2009
DE    102008061304    7/2009
(Continued)

OTHER PUBLICATIONS

International Search Report for International Application No. PCT/EP2013/067096 mailed Nov. 13, 2013.

*Primary Examiner* — Frank Duong
(74) *Attorney, Agent, or Firm* — RatnerPrestia

(57) ABSTRACT

A method and system for compensating for a time discrepancy. A first and a second vehicle-to-X communication system resort to an external time base. The first vehicle-to-X communication system determines a first internal time base from the external time base and the second vehicle-to-X communication system determines a second internal time base from the external time base. The first vehicle-to-X communication system sends vehicle-to-X data and the second vehicle-to-X communication system receives vehicle-to-X data. The vehicle-to-X data to be sent include a time stamp generated from the first internal time base and captured ambient sensor data include a first time stamp generated from the second internal time base. Alignment of the captured ambient sensor data with the received vehicle-to-X data is used to determine the time discrepancy between the first internal time base and the second internal time base and to compensate for it using a correction value.

16 Claims, 3 Drawing Sheets

(51) Int. Cl.
*G08G 1/01* (2006.01)
*H04B 7/185* (2006.01)

(56) References Cited

U.S. PATENT DOCUMENTS 8,688,376 B2 * 4/2014 Stahlin .................... H04W 4/22
340/426.36

2008/0189009 A1 * 8/2008 Wang ................. G01R 31/2829
701/31.1

FOREIGN PATENT DOCUMENTS

| | | |
|---|---|---|
| DE | 102009045748 | 4/2011 |
| WO | 03077086 | 9/2003 |
| WO | 2010139807 | 12/2010 |

* cited by examiner

METHOD AND SYSTEM FOR COMPENSATING FOR A TIME DISCREPANCY

CROSS REFERENCE TO RELATED APPLICATIONS

This application is the U.S. National Phase Application of PCT International Application No. PCT/EP2013/067096, filed Aug. 15, 2013, which claims priority to German Patent Application No. 10 2012 214 555.9, filed Aug. 16, 2012, the contents of such applications being incorporated by reference herein.

FIELD OF THE INVENTION

The invention relates to a method for compensating for a time discrepancy and to a system for compensating for a time discrepancy.

BACKGROUND OF THE INVENTION

A large number of different ambient sensors in motor vehicle applications are known from the prior art. These are seeing increasingly widespread use on account of the many and diverse new opportunities that such sensor systems provide in connection with driver assistance systems. The ambient sensors used in this case are radar sensors, camera sensors and lidar sensors, for example. Similarly, navigation systems, which are usually of GPS-based design, are also already present as standard in an increasing number of current vehicles. These navigation systems perform position finding on the basis of received satellite signals and guide the driver to the destination along a journey route determined using a digital map. By contrast, what are not yet ready for large-scale production are what are known as vehicle-to-X communication systems, the extensive introduction of which, at least for new vehicles, has already been decided upon for the years to come, however, and which are currently still subject to standardization efforts. These communication systems communicate wirelessly in this context and interchange data about information captured by ambient and vehicle sensors, inter alia, with one another.

In this connection, DE 10 2007 058 192 A1, which is incorporated by reference, describes a central controller for a plurality of assistance systems provided in a motor vehicle, at least some of which are equipped with ambient sensors, wherein, according to DE 10 2007 058 192 A1, which is incorporated by reference, a telematic system is also understood to mean an ambient sensor. The central controller is connected to the individual assistance systems at data level and plausibilizes the information from individual ambient sensors using the information from other ambient sensors. By way of example, the image information for a camera can confirm the distance measurement by a radar sensor. Individual pieces of sensor information can therefore be confirmed and are available in redundant form. Such coupling of individual signals from different sensors is also known as sensor fusion.

DE 10 2008 061 304 A1, which is incorporated by reference, discloses a vehicle-to-X communication device for a vehicle for wirelessly transmitting vehicle-relevant data. In this case, these data are transmitted to surrounding vehicles or to infrastructure devices. The communication device described comprises two separate communication units, the first communication unit being designed on the basis of a WLAN connection and the second communication unit being designed on the basis of a remote keyless entry (RKE) connection.

DE 10 2009 045 748 A1, which is incorporated by reference, discloses a method and an apparatus for ascertaining the status of wireless vehicle-to-X communication by a vehicle with its surroundings. To this end, not only is the transmission quality of received messages rated but also a statement about the quantity or quality of the communication subscribers is made. By way of example, this is accomplished by virtue of the analysis of the radio messages prompting ascertainment of the transit time for the message. In order to ascertain this transit time, each radio message may have a time stamp from a shared time base about its transmission instant, the shared time base being the time base from a global satellite navigation system, such as GPS or Galileo.

However, even when the time base from a global satellite navigation system is used as a shared time base, the vehicle-to-X communication systems known from the prior art are disadvantageous insofar as the different satellite navigation reception modules have different processing periods and processing methods for the satellite signals received, depending on the manufacturer. Therefore, even vehicle-to-X messages sent at the same time can be denoted using different time stamps. By way of example, one and the same time stamp can denote both that instant at which all satellite signals required for a position finding step are received and that instant at which the processing of all satellite signals is complete. Accordingly, the time discrepancy for identical time stamps may typically be several 100 ms. At a vehicle speed of approximately 100 km/h, a time discrepancy of 100 ms already results in a position error of 3 m, which is inadequate, particularly for safety-critical vehicle applications.

SUMMARY OF THE INVENTION

An aspect of the invention proposes a method that allows compensation for time discrepancies in the various vehicle-to-X communication systems.

On the basis of the method according to an aspect of the invention for compensating for a time discrepancy, in which a first and a second vehicle-to-X communication system resort to an external time base, the first vehicle-to-X communication system determines a first internal time base from the external time base and the second vehicle-to-X communication system determines a second internal time base from the external time base. In addition, the first vehicle-to-X communication system sends vehicle-to-X data and the second vehicle-to-X communication system receives vehicle-to-X data, wherein vehicle-to-X data to be sent are denoted using a time stamp created from the first internal time base and captured ambient sensor data are denoted using a first time stamp created from the second internal time base. The method is distinguished in that temporal consistency checking between captured ambient sensor data and the received vehicle-to-X data is used to determine the time discrepancy between the first internal time base and the second internal time base and to compensate for said time discrepancy using a correction value.

Temporal consistency checking between the ambient sensor data and the received vehicle-to-X data allows events to be ascertained that are described both in the ambient sensor data and in the vehicle-to-X data but are denoted using different time stamps. One example is the execution of emergency braking in a vehicle traveling ahead of the ego vehicle, for example. Since the ambient sensor data, like the second vehicle-to-X communication system, are subject to the second internal time base for timing, the temporal consistency checking between the events described both in the ambient sensor data and in the vehicle-to-X data denoted using the time stamp created from the first internal time base identifies a possible time discrepancy between the first internal time base of the first vehicle-to-X communication system and the second internal time base of the second vehicle-to-X communication system. This time discrepancy is determined and is compensated for using a correction value that corresponds to the time discrepancy, which correction value is added to or subtracted from the time stamp as an offset value.

The correction value ascertained in this manner is subsequently used to match the timing of all vehicle-to-X data that are sent by the first vehicle-to-X communication system and received by the second vehicle-to-X communication system to that of the second internal time base of the second vehicle-to-X communication system. To this end, the ascertained correction value can be stored in the second vehicle-to-X communication system for a particular period of time, e.g. five minutes.

This results in the advantage that precise temporal classification of the received vehicle-to-X data and the events described by the vehicle-to-X data is made possible, since the method according to the invention compensates for the time discrepancy using the correction value. On the basis of this precise temporal classification, it is possible to improve the effectiveness and the efficiency of numerous driver assistance systems.

The first vehicle-to-X communication system is preferably arranged in a first motor vehicle and the second vehicle-to-X communication system is preferably arranged in a second motor vehicle.

In addition, it is preferred that the first and second vehicle-to-X communication systems resort to a time base of a global navigation satellite system as external time base. Since a large number of new vehicles are already equipped with position finding apparatuses through a global navigation satellite system, such as GPS, as standard, these vehicles therefore have the opportunity to resort the time base of the GPS without additional expenditure. A further advantage can be seen in that the time base of a global navigation satellite system is comparatively precise.

Advantageously, the consistency checking involves the use of a first data curve created by means of temporal interpolation and/or extrapolation of the ambient sensor data and/or a second data curve created by means of temporal interpolation and/or extrapolation of the received vehicle-to-X data. Usually, an ambient sensor system captures the ambient sensor data not continuously but rather in clocked fashion, i.e. only once per operating cycle.

Similarly, the first vehicle-to-X communication system sends the vehicle-to-X data usually only once per operating cycle. Since the operating cycles of the vehicle-to-X communication system and the ambient sensor system are in most cases different from one another, however, apparent continuity can nevertheless be produced by the interpolation or extrapolation of the ambient sensor data and the vehicle-to-X data. Looking for identical events that are described both in the ambient sensor data and in the received vehicle-to-X data and comparing the time stamps therefore allows the time discrepancy to be determined. By way of example, temporal interpolation takes place in the form that a straight line is drawn between two pieces of position information from a surrounding vehicle that are received by means of the vehicle-to-X communication system, the course of the straight line having a high probability of corresponding to the actual position of the surrounding vehicle during the time between the sending of the two pieces of position information. This results in the advantage that the time discrepancy or the correction value can be determined even in cases in which the ambient sensor data, owing to the clocked manner of operation of the ambient sensor system using the second time stamp, denote only discrete instants at which there are no received vehicle-to-X data available.

In a further preferred embodiment, the consistency checking involves the use of a piece of speed information from captured Doppler effect data from a radar sensor and a piece of speed information from received vehicle-to-X data. Determination of the speed information for a surrounding vehicle from captured Doppler effect data from a radar sensor is possible in a comparatively simple and precise manner. Since, furthermore, the speed information for the surrounding vehicle can be captured and sent by the latter itself without any problem, the speed information is particularly well suited to determining the time discrepancy and hence the correction value.

Preferably, the method is distinguished in that the consistency checking involves the use of a piece of state change information for a traffic signal installation from captured image data from a camera sensor and a piece of state change information for the traffic signal installation from received vehicle-to-X data. This information is comparatively simple to capture and therefore advantageously affords the opportunity to determine the time discrepancy. In this case, the first vehicle-to-X communication system is associated with a traffic signal installation.

Expediently, the consistency checking involves the use of a piece of position information from captured distance data from a distance sensor and a piece of position information from received vehicle-to-X data. Since many vehicles already have distance sensors as standard, it is possible for the position information to be determined from captured distance data and checked for consistency with the position information from the received vehicle-to-X data without additional expenditure in terms of cost and manufacture. To this end, it is usually also necessary for the relative position information from the distance data from the distance sensor to be converted into an absolute position, as typically contained in the vehicle-to-X data, or vice versa. The pieces of position information are furthermore comparatively simple to determine.

Preferably, the consistency checking is based on a multiplicity of ambient sensor data records averaged using one or more statistical averaging methods. This increases the reliability and precision of the inventive compensation for the time discrepancy, since measurement errors and what are known as data outliers are neutralized on average.

Furthermore, it is advantageous that the correction value is taken from a data fusion process, wherein the data fusion process is used to fuse ambient sensor data and vehicle-to-X data. In the case of an inherently known data fusion process of this kind, matching of different time bases is a necessary prerequisite for data fusion anyway. In this case, these data fusion processes are often used to improve position finding and use different filter methods, such as a Kalman filter. Since such a data fusion process thus needs to prompt compensation for time discrepancies anyway, the time discrepancies identified can advantageously be used for the method according to the invention essentially without additional expenditure in terms of computation.

In addition, the correction value is determined for each first and each second vehicle-to-X communication system individually. Since each vehicle-to-X communication system determines an individual internal time base, individual determination of the correction value for compensating for the individual time discrepancies is also necessary. Advantageously, a large number of individual correction values are stored in each first vehicle-to-X communication system for a particular time.

An aspect of the present invention additionally relates to a system for compensating for a time discrepancy, which comprises an external timer and at least a first and a second communication subscriber, wherein the first communication subscriber comprises a first vehicle-to-X communication system having a first internal timer and the second communication subscriber comprises a second vehicle-to-X communication system having a second internal timer and ambient sensors and electronic consistency checking means. The first and second vehicle-to-X communication systems resort to an external time base of the external timer, wherein the first vehicle-to-X communication system uses the first internal timer to determine a first internal time base and the second vehicle-to-X communication system uses the second internal timer to determine a second internal time base. In addition, the first vehicle-to-X communication system sends vehicle-to-X data and the second vehicle-to-X communication system receives vehicle-to-X data, wherein the first internal timer denotes vehicle-to-X data to be sent using a time stamp created from the first internal time base and wherein the second internal timer denotes captured ambient sensor data using a second time stamp created from the second internal time base. The system according to the invention is distinguished in that the electronic consistency checking means use temporal consistency checking between captured ambient sensor data and received vehicle-to-X data to determine the time discrepancy between the first timer and the second timer and to compensate for said time discrepancy using a correction value. Since the system according to the invention therefore comprises all means and apparatuses that are necessary for carrying out the method according to the invention, the advantages already described are obtained.

Preferably, the ambient sensors are one or more elements from the group comprising
radar sensor,
optical camera sensor,
lidar sensor,
laser sensor and
ultrasonic sensor.

The cited elements are suited to capturing ambient sensor data that can be checked for consistency with the received vehicle-to-X data. Hence, they can advantageously be used for the system and method according to the invention.

Furthermore, it is advantageous that the vehicle-to-X communication means send and/or receive vehicle-to-X data on the basis of one or more connection classes from the group comprising
WLAN connection, particularly based on IEEE 802.11,
ISM (Industrial, Scientific, Medical Band) connection,
Bluetooth® connection,
ZigBee connection,
UWB (Ultra Wide Band) connection,
WiMax® (Worldwide Interoperability for Microwave Access) connection,
Infrared connection,
mobile radio connection and
radar-based communication.

The cited connection types afford different advantages, depending on type, wavelength and data protocol used. Thus, some of the cited connection types allow a comparatively high data transmission rate and comparatively fast connection setup, for example, whereas others are, to the greatest possible extent, well suited to data transmission around visual obstacles. The combination and simultaneous or parallel use of a plurality of these connection types result in further advantages, since in this way it is also possible to compensate for disadvantages of individual connection types.

Preferably, the system carries out the method according to the invention.

The invention additionally relates to the use of the system according to the invention in a vehicle, particularly in a motor vehicle.

BRIEF DESCRIPTION OF THE DRAWINGS

Further preferred embodiments will emerge from the subclaims and the description of an exemplary embodiment below with reference to figures, in which

DETAILED DESCRIPTION OF THE PREFERRED EMBODIMENTS

Figure 1:
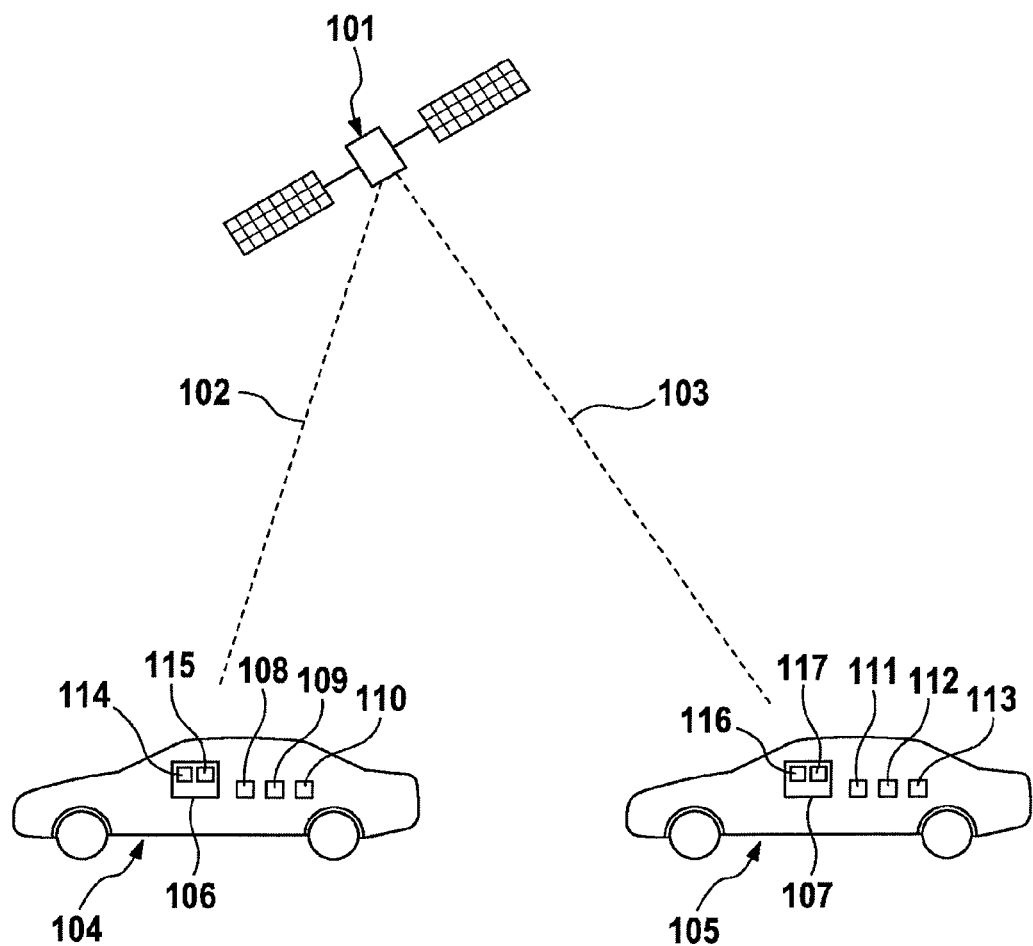
FIG. 1 shows a possible embodiment of the method according to the invention for compensating for a time discrepancy.

FIG. 1 shows GPS satellite 101, which is used, according to the example, as an external timer and sends identical GPS signals 102 and 103 to communication subscribers 104 and 105. According to the example, communication subscribers 104 and 105 are motor vehicles, wherein communication subscriber 104 comprises first vehicle-to-X communication system 106 and communication subscriber 105 comprises second vehicle-to-X communication system 107. Communication subscriber 104 additionally comprises ambient sensors 108, 109 and 110 in the form of mono camera sensor 108, ultrasonic sensor 109 and radar sensor 110 and communication subscriber 105 comprises ambient sensors 111, 112 and 113 in the form of radar sensor 111, lidar sensor 112 and stereo camera sensor 113. First vehicle-to-X communication system 106 for its part comprises first internal timer 114 and electronic consistency checking means 115, while second vehicle-to-X communication system 107 for its part comprises second internal timer 116 and electronic consistency checking means 117. First internal timer 114 and second internal timer 116 are embodied as GPS modules and receive GPS signals 102 and 103. From GPS signal 102, first internal timer 114 determines a first internal time base, and from GPS signal 103, second internal timer 116 determines a second internal time base. Owing to the different hardware design and the different data processing structure of GPS modules 114 and 116, the first internal time base differs from the second internal time base, even though GPS signals 102 and 103 comprise identical time information. Radar sensor 111 is used by vehicle 105 to capture distance data that describe the distance from vehicle 105 to vehicle 104. Said distance data are denoted using a second time stamp created from the second internal time base. From the ego position of vehicle 105, which is known from GPS module 116, a piece of absolute position information for vehicle 104 is then calculated. At the same time, the first vehicle-to-X communication system 106 in vehicle 104 sends vehicle-to-X data that comprise, inter alia, a piece of absolute position information for vehicle 104. The vehicle-to-X data sent by the first vehicle-to-X communication system 106 are furthermore denoted by a first time stamp that has been created on the basis of the first internal time base. The vehicle-to-X data comprising the position information are received by second vehicle-to-X communication system 107 in vehicle 105. Electronic consistency checking means 117 then check the consistency of the timing between the position information that the vehicle-to-X data comprise and the position information determined by means of radar sensor 111, i.e. the vehicle-to-X data are searched for a piece of position information that matches a piece of position information in the distance data from radar sensor 111, and the first time stamp denoting the vehicle-to-X data is compared with the second time stamp denoting the distance data. From this, second electronic consistency checking means 117 determine a time discrepancy between the first time stamp and the second time stamp and compensate therefor using a correction value that corresponds to the time discrepancy. According to the example, the time discrepancy is 250 ms, since the first internal time base leads the second internal time base by 250 ms. The correction value is accordingly likewise 250 ms and is subtracted from the first time stamp by second electronic consistency checking means 117 in order to compensate for the identified time discrepancy.

Figure 2:
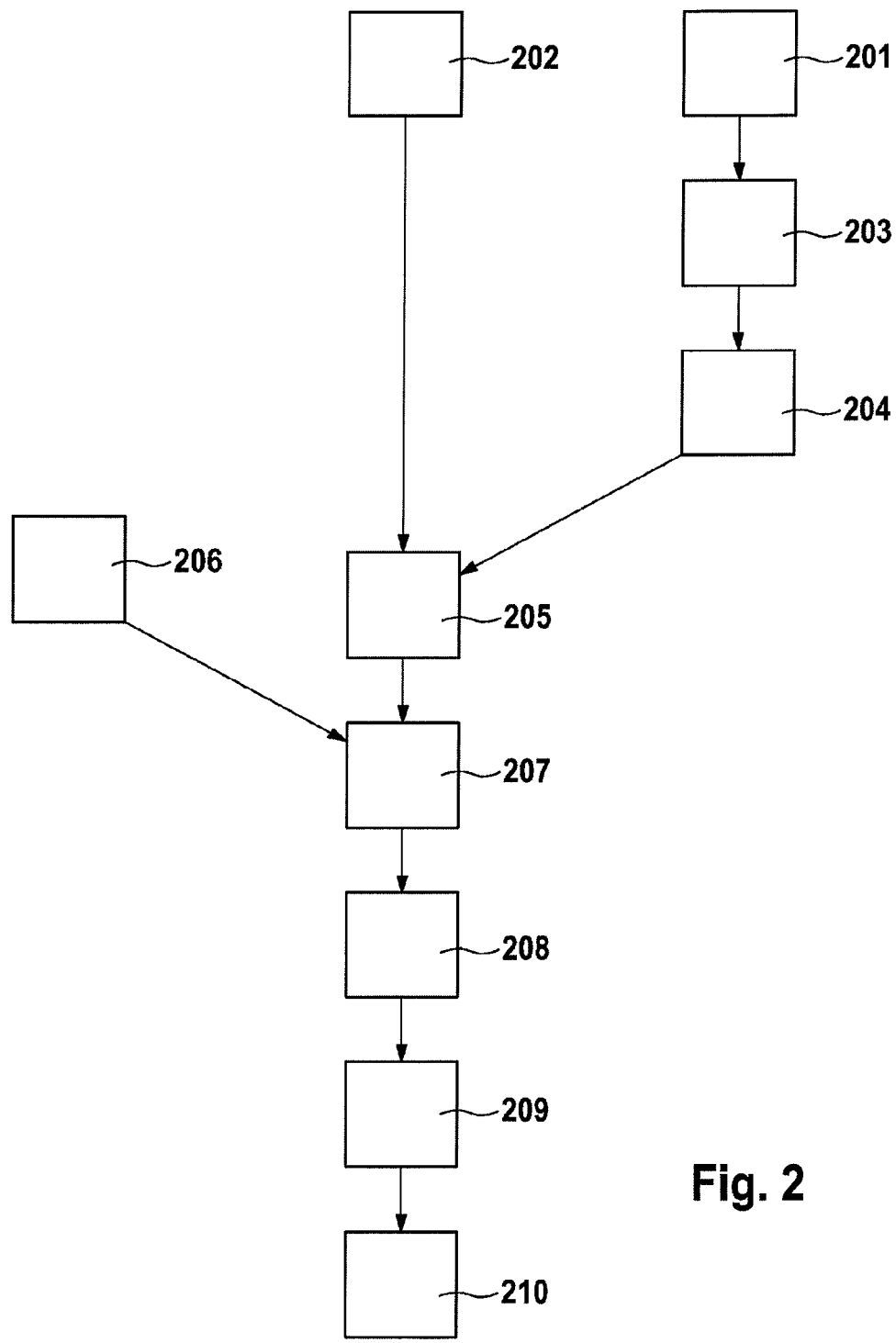
FIG. 2 shows an exemplary course of the method according to the invention in the form of a flow chart.

FIG. 2 shows a possible embodiment of the method according to the invention in the form of a flow chart. In method step 201, a second vehicle-to-X communication system determines a second internal time base from an external time base. At the same time, in step 202, a first vehicle-to-X communication system determines a first internal time base from the external time base. In step 203, the vehicle-to-X data to be sent, in a first vehicle-to-X communication system, are denoted using a time stamp created from the first internal time base. In the subsequent step 204, the vehicle-to-X data to be sent are sent by the first vehicle-to-X communication system and received in step 205 by the second vehicle-to-X communication system. Furthermore, in step 206, ambient sensor data are captured and are denoted using a second time stamp from the second internal time base. In method step 207, the captured ambient sensor data are then checked for temporal consistency with the received vehicle-to-X data, i.e. the ambient sensor data and the vehicle-to-X data are searched for matching information in order to establish the time discrepancy between the second time stamp denoting the ambient sensor data and the first time stamp denoting the vehicle-to-X data in step 208. On the basis of the time discrepancy determined, a correction value that corresponds to the time discrepancy determined is then created in method step 209. In step 210, the time discrepancy between the first internal time base and the second internal time base is then compensated for using the correction value.

Figure 3:
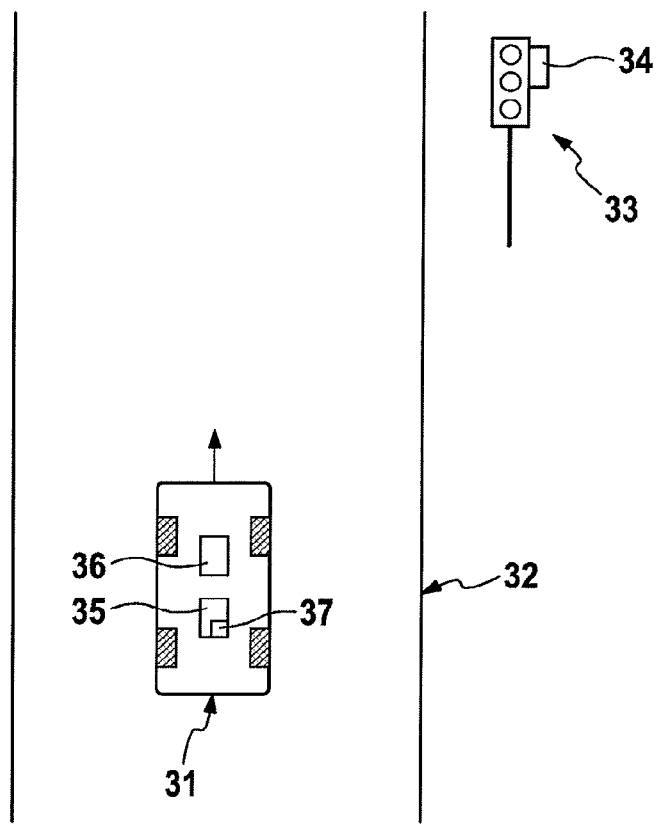
FIG. 3 shows a vehicle that uses a piece of state change information for a traffic signal installation from captured image data and from received vehicle-to-X data for temporal consistency checking.

FIG. 3 shows vehicle 31, which is approaching traffic signal installation 33 on road 32. Traffic signal installation 33 is equipped with first vehicle-to-X communication system 34, and vehicle 31 is equipped with second vehicle-to-X communication system 35, which comprises electronic consistency checking means 37. Furthermore, vehicle 31 is equipped with camera sensor 36, which captures image data from traffic signal installation 33. Traffic signal installation 33 uses first vehicle-to-X communication system 34 to send vehicle-to-X data comprising a piece of state change information, which vehicle-to-X data are denoted using a first time stamp created from the first internal time base by first vehicle-to-X communication system 34. The state change information states that a state change for traffic signal installation 33, i.e. a change from red to amber, will take place in 5 s on the basis of the first time stamp. Camera sensor 36 captures image data describing the state change, which image data are denoted using a time stamp created from the second internal time base, 4.5 s after reception of the vehicle-to-X data. Electronic consistency checking means 37 then use the state change information from the captured image data and the state change information from the received vehicle-to-X data to determine the time discrepancy and a correction value corresponding to the time discrepancy from the first and second time stamps.

The invention claimed is:
1. A method for compensating for a time discrepancy,
in which a first and a second vehicle-to-X communication system resort to an external time base,
wherein the first vehicle-to-X communication system determines a first internal time base from the external time base and the second vehicle-to-X communication system determines a second internal time base from the external time base,
wherein the first vehicle-to-X communication system sends vehicle-to-X data and the second vehicle-to-X communication system receives vehicle-to-X data,
wherein vehicle-to-X data to be sent are denoted using a first time stamp created from the first internal time base, and
wherein captured ambient sensor data are denoted using a first time stamp created from the second internal time base, wherein
temporal consistency checking between the captured ambient sensor data and the received vehicle-to-X data is used to determine the time discrepancy between the first internal time base and the second internal time base and to compensate for said time discrepancy using a correction value.

2. The method as claimed in claim 1, wherein the first and second vehicle-to-X communication systems resort to a time base of a global navigation satellite system as the external time base.

3. The method as claimed in claim 1, wherein
the consistency checking involves the use of a first data curve created by means of temporal interpolation and/or extrapolation of the ambient sensor data and/or a second data curve created by temporal interpolation and/or extrapolation of the received vehicle-to-X data.

4. The method as claimed in claim 1, wherein
the consistency checking involves the use of a piece of speed information from captured Doppler effect data from a radar sensor and a piece of speed information from received vehicle-to-X data.

5. The method as claimed in claim 1, wherein
the consistency checking involves the use of a piece of state change information for a traffic signal installation from captured image data from a camera sensor and a piece of state change information for the traffic signal installation from received vehicle-to-X data.

6. The method as claimed in claim 1, wherein
the consistency checking involves the use of a piece of position information from captured distance data from a distance sensor and a piece of position information from received vehicle-to-X data.

7. The method as claimed in claim 1, wherein
the consistency checking is based on a multiplicity of ambient sensor data records averaged using one or more statistical averaging methods.

8. The method as claimed in claim 1, wherein
the correction value is taken from a data fusion process, wherein the data fusion process is used to fuse ambient sensor data and vehicle-to-X data.

9. The method as claimed in claim 1, wherein
the correction value is determined for each first and each second vehicle-to-X communication system individually.

10. A system for compensating for a time discrepancy, comprising an external timer and at least a first and a second communication subscriber, wherein the first communication subscriber comprises a first vehicle-to-X communication system having a first internal timer and the second communication subscriber comprises a second vehicle-to-X communication system having a second internal timer and ambient sensors and electronic consistency checking means, wherein the first and second vehicle-to-X communication systems resort to an external time base of the external timer, wherein the first vehicle-to-X communication system uses the first internal timer to determine a first internal time base and the second vehicle-to-X communication system uses the second internal timer to determine a second internal time base,
wherein the first vehicle-to-X communication system sends vehicle-to-X data and the second vehicle-to-X communication system receives vehicle-to-X data,
wherein the first internal timer denotes vehicle-to-X data to be sent using a time stamp created from the first internal time base and
wherein the second internal timer denotes captured ambient sensor data using a first time stamp created from the second internal time base,
wherein the electronic consistency checking means use temporal consistency checking between captured ambient sensor data and received vehicle-to-X data to determine the time discrepancy between the first timer and the second timer and to compensate for said time discrepancy using a correction value.

11. The system as claimed in claim 10, wherein the ambient sensors are one or more elements selected from the group consisting of
a radar sensor,
an optical camera sensor,
a lidar sensor,
a laser sensor and
an ultrasonic sensor.

12. The system as claimed in claim 10, wherein
the vehicle-to-X communication systems send and/or receive vehicle-to-X data on the basis of one or more connection classes selected from the group consisting of
a WLAN connection, based on IEEE 802.11,
an ISM (Industrial, Scientific, Medical Band) connection,
a Bluetooth® connection,
a ZigBee connection,
a UWB (Ultra Wide Band) connection,
a WiMax® (Worldwide Interoperability for Microwave Access) connection,
an Infrared connection,
a mobile radio connection and
a radar-based communication.

13. The system as claimed in claim 10, wherein
the system carries out a method for compensating for a time discrepancy,
in which a first and a second vehicle-to-X communication system resort to an external time base
wherein the first vehicle-to-X communication system determines a first internal time base from the external time base and the second vehicle-to-X communication system determines a second internal time base from the external time base,
wherein the first vehicle-to-X communication system sends vehicle-to-X data and the second vehicle-to-X communication system receives vehicle-to-X data,
wherein vehicle-to-X data to be sent are denoted using a first time stamp created from the first internal time base, and
wherein captured ambient sensor data are denoted using a first time stamp created from the second internal time base, wherein temporal consistency checking between the captured ambient sensor data and the received vehicle-to-X data is used to determine the time discrepancy between the first internal time base and the second internal time base and to compensate for said time discrepancy using a correction value.

14. The use of the system as claimed in claim 10 in a motor vehicle.

15. The method as claimed in claim 2, wherein
the consistency checking involves the use of a first data curve created by temporal interpolation and/or extrapolation of the ambient sensor data and/or a second data curve created by temporal interpolation and/or extrapolation of the received vehicle-to-X data.

16. The system as claimed in claim 11, wherein
the vehicle-to-X communication systems send and/or receive vehicle-to-X data on the basis of one or more connection classes selected from the group consisting of
a WLAN connection, based on IEEE 802.11,
an ISM (Industrial, Scientific, Medical Band) connection,
a Bluetooth® connection,
a ZigBee connection,
a UWB (Ultra Wide Band) connection,
a WiMax® (Worldwide Interoperability for Microwave Access) connection,
an Infrared connection,
a mobile radio connection and
a radar-based communication.

* * * * *